Patented Dec. 1, 1925.

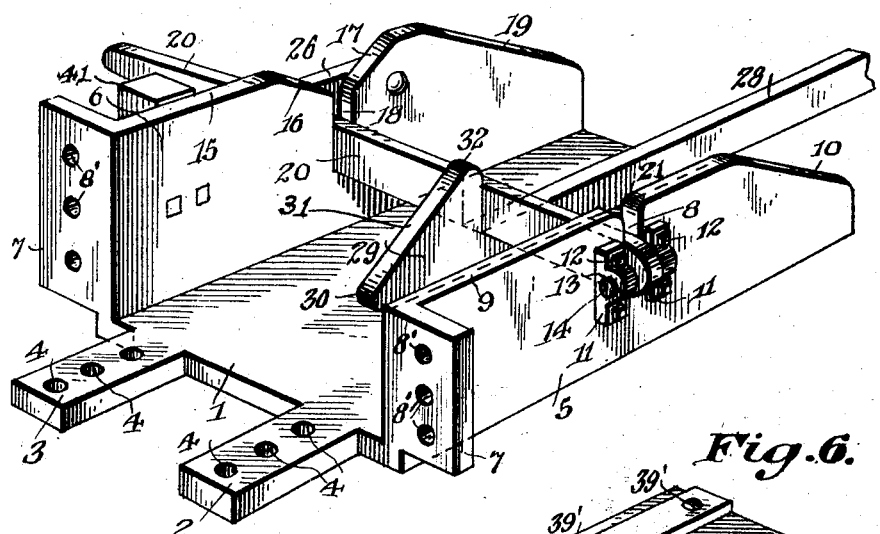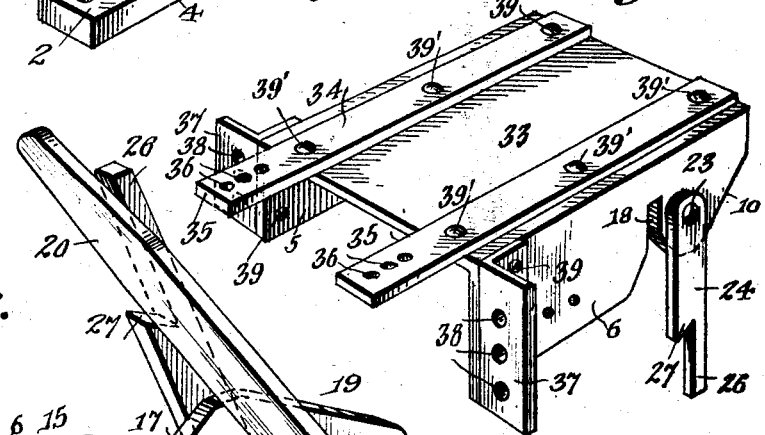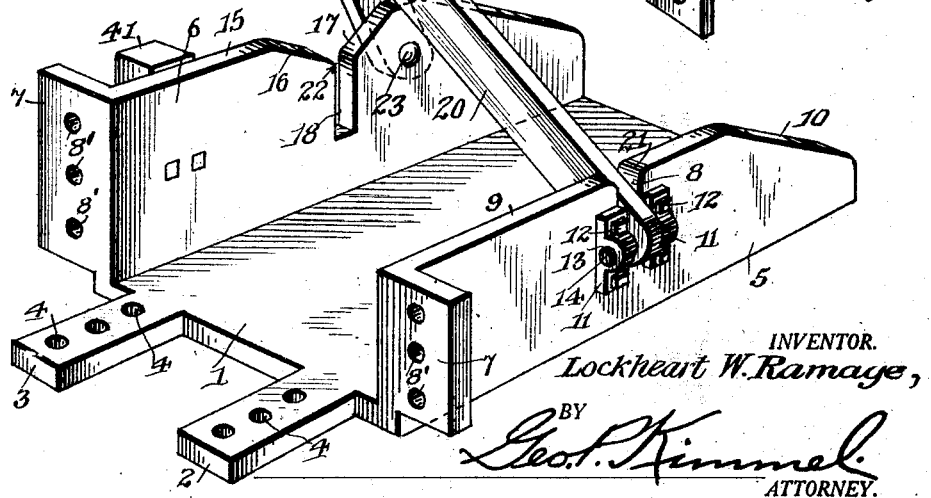

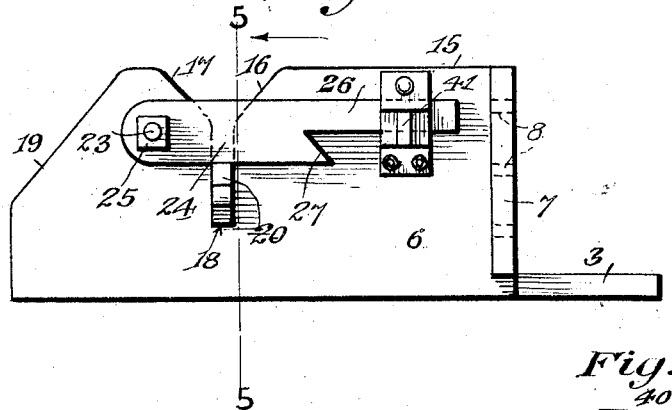
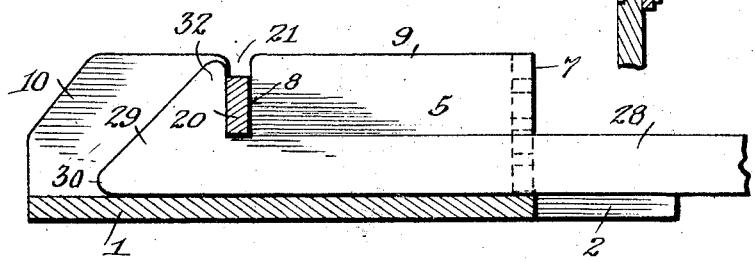
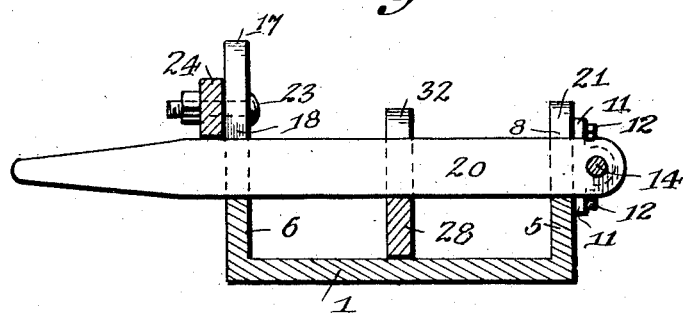

1,564,111

UNITED STATES PATENT OFFICE.

LOCKHEART W. RAMAGE, OF ILFRACOMBE, QUEENSLAND, AUSTRALIA.

CAR COUPLER.

Application filed July 9, 1924. Serial No. 725,001.

*To all whom it may concern:*

Be it known that I, LOCKHEART W. RAMAGE, a subject of the King of Great Britain, residing at Ilfracombe, Queensland, Australia, have invented certain new and useful Improvements in Car Couplers, of which the following is a specification.

This invention relates to a car coupler for automatically coupling freight cars, passenger coaches and trucks together, but it is to be understood that a coupler in accordance with this invention can be employed for any purposes for which it is found applicable, and the invention has for its object to provide, in a manner as hereinafter set forth, a device of such class including means whereby a pair of cars can be quickly and automatically coupled together when moved in abutting relation with respect to each other.

A further object of the invention is to provide a coupler of the class referred to, in a manner as hereinafter set forth, with a combined draft and coupling element coacting with a shiftable connecting bar for coupling a pair of cars together, and further with means for removably holding said connecting bar in operative position with respect to said element to maintain the cars in coupled relation.

A further object of the invention is to provide a coupling of the class referred to, in a manner as hereinafter set forth, with means for detachably holding the connecting bar in an elevated position to enable the shunting of one car relative to the other.

Further objects of the invention are to provide a coupling of the class referred to and in a manner as hereinafter set forth, which is simple in its construction and arrangement, strong, durable, reliable, automatic in its action to couple, thoroughly efficient in its use, readily set up with respect to a car, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view of a coupler in accordance with this invention.

Figure 2 is a perspective view of the device, with the combined draft and coupling element omitted and further illustrating the connection bar in an elevated position when the device is set for shunting purposes.

Figure 3 is a side elevation of the coupler.

Figure 4 is a longitudinal sectional view thereof.

Figure 5 is a section on line 5—5, Figure 3.

Figure 6 is an inverted perspective view of a modified form of the body portion.

Figure 7 is a fragmentary view, in section, illustrating a spring controlled catch for the retaining bar.

A coupler, in accordance with this invention comprises a connecting bar, a retaining bar therefor, a combined coupling and draft bar, and a body portion providing a support for the connecting and retaining bars. The combined coupling and draft bar is connected to one end of the car and the body portion to the other end of the car. The combined draft and coupling bar cooperates with the connecting bar for the purpose of coupling two cars together. The combined draft and coupling bar, the retaining bar and the connecting bar each is of substantial thickness and length and constructed of metallic material.

With reference to Figures 1 to 5, the body portion is in the form of an integral channel-shaped metallic casting of substantial width, length and thickness and comprises a bottom 1, having integral therewith and projecting from the rear edge thereof a pair of spaced rectangular extensions 2, 3, formed with apertures 4 for the passage of hold-fast devices, not shown, for connecting said extensions to the lower face of a car truck.

Formed integral with the bottom 1, at each side thereof, is a pair of vertically extending side members 5, 6, and with the member 5 of less height than the member 6. The rear end of each of the members 5, 6, has formed integral therewith, a right angularly disposed rectangular flange 7, provided with openings 8' for the passage of hold-fast devices not shown, to secure said flanges 7 to the car truck.

The side member 5, intermediate its ends, is formed with a vertically disposed slot 8 which extends from the top edge 9 of the member 5 and terminates at a point removed from the bottom 1. The forward portion of the top edge 9 of the member 5 is inclined downwardly, as at 10, whereby the forward portion of the side member 5 will be of less height than the remaining portion thereof. Arranged at each side of the slot 8 and against the outer face of the member 5, is a support 11, fixedly secured in position by the hold-fast devices 12 and formed with an opening 13. The openings 13 of said supports are arranged in alignment and secured therein is a stub shaft 14, for a purpose to be presently referred to.

The side member 6, intermediate its ends, has its top edge 15 oppositely bevelled, as at 16, 17, and the said bevelled portions of said top edge merge into the side walls of a vertically disposed slot 18, which terminates at a point above the bottom 1. The forward portion of the top edge 15 is inclined downwardly, as at 19, to reduce the height of the forward portion of said side member 6.

The slots 8 and 18 are provided for the reception of a connecting bar 20, which is of materially greater length than the width of the body portion. One end of the bar 20 is connected to the stub shaft 14, and the latter provides a pivot therefor, and said bar 20 when in operative position is supported on the bottom of the slots 8 and 18, in a manner as shown in Figure 1. The bevelled portions 16 and 17 facilitate the entrance of the connecting bar 20 into the slot 18.

The point of junction of each of the side walls of the slot 8 with the top edge 9 of the side member 6 is rounded, as at 21, to facilitate the entrance of the bar 20 in the slot 8. The point of junction of each of the side walls of the slot 18 and a bevelled portion 16 or 17 is rounded, as at 22.

Fixedly secured to the side member 6, at a point between the slot 18 and the forward end thereof, is a pivot 23, upon which is mounted one end of a retaining bar 24 which cooperates with the connecting bar and performs two functions, one of which is to maintain the connecting bar in operative position with respect to the combined draft and coupling bar, and the other of which is to detachably support the connecting bar in an elevated position when it is desired to shunt one car with respect to the other.

The pivot 23 projects outwardly from the side member 6 and carries a securing nut 25 for the purpose of maintaining the retaining bar on the pivot. The retaining bar 24 has its outer portion of less width than its inner portion, as at 26, and by this arrangement a shoulder 27 is formed which constitutes a seat for maintaining the bar 20 in elevated position, as shown in Figure 2. The seat is inwardly bevelled. The bar 24 is of a length to extend from the pivot 23 to a point in proximity to the flange 7 on the side member 6. See Figure 3.

As before stated, the side member 6 is of greater height than the side member 5 and which permits of the setting up of the slot 18 of greater length than the slot 8, and as the connecting bar shifts upwardly when coacting with the combined draft and coupling bar, during the operation of coupling, the length of the slot 18 provides for the connecting bar remaining therein during its elevation or when impacted by the combined draft and coupling bar during the act of coupling.

The combined draft and coupling bar consists of a stem 28 of substantial length terminating at its forward end in a triangular-shaped head 29 having its rear end of materially greater height than the height of the stem 28. The bottom of the stem 28 is flush with the bottom of the head 29, and the latter has a rounded forward end 30 and its top inclining upwardly and rearwardly, as at 31. The upper rear corner of the head 29 is rounded, as at 32.

With respect to the modified form of body portion shown in Figure 6, the integral extensions 2 and 3 are omitted, as well as the integral flanges 7, and in lieu thereof the body portion, which is referred to generally by the reference character 33, has secured to the lower face of its bottom a pair of spaced lengthwise extending flat reinforcing bars 34, which extend from the forward edge of the body portion and project a substantial distance from the rear end thereof, as at 35. The projecting rear end 35 of the bars 34 is provided with openings 36, for the passage of hold-fast devices, not shown, to secure the body portion 33 to the car truck. The ends 35 of the bars 34 perform the same function as the extensions 2 and 3.

Secured to the outer face of the side members of the body portion 33 at the rear thereof, is a pair of angle-irons 37, having openings 38 for the passage of hold-fast devices, not shown, to secure the body portion 33 to the truck. The angle irons 37 perform the function of the flanges 7. The hold-fast devices for securing the bars 34 to the body portion 33 are indicated at 39' and the hold-fast devices for securing the angle-irons to the side members of the body portion 33 are indicated at 39. Otherwise than that as stated, the construction shown in Figure 6 is the same as that shown in Figure 1 to 5.

To prevent the accidental elevation of the retaining bar 24 a spring controlled catch 40 is adapted to extend over the rear portion 26 of the bar 24. The spring controlled catch or latch 40 is mounted in a bracket 41 secured to the outer face of the side member 6.

When the coupler is used, the connecting bar 20 extends transversely of the body portion and is seated in the slots 8 and 18. As the cars approach each other the forward end of the head 30 engages under the connecting bar 20 and the inclined top edge 31 of the head 29 will raise the connecting bar 20 until said edge 31 clears the bar 20 whereby the bar 20 will fall by gravity upon the top edge of the stem 28 rearwardly of the head 29, whereby the coupling action will be completed. After the bar 20 has assumed the position shown in Figure 1, the retaining bar is moved to the position shown in Figures 1 and 3. When the connecting bar and combined draft and coupling bar are coupled together, the side walls of the slots 8 and 18 will provide abutments for the bar 20 when a pull is exerted on the car carrying the body portion or on the car carrying the combined draft and coupling bar, so that a draft connection will be set up between the two cars.

If it is desired to release the cars, the retaining bar is shifted to the position shown in Figure 2, and the connecting bar elevated and mounted on the seat formed by the shoulder 27.

Although the coupler is designed primarily for use in connection with freight cars and passenger coaches, yet it is obvious that it can be employed for the cars of toy trains and further it is thought that the many advantages of a coupler construction, in accordance with this invention, particularly in view of its automatic action, strength, durability, simplicity and reliability, can be readily understood, and further although the preferred embodiment of the invention is as illustrated and described, yet it is to be understood that changes in the details of construction can be had which will fall within the scope of the invention as claimed.

What I claim is:—

1. A car coupler comprising a channel-shaped casing having apertured extensions at one end of its bottom and lateral apertured flanges at its sides, said flanges and extensions positioned at the inner end of said casing for connecting it to a car truck, said casing further having each of its side walls intermediate its ends formed with a vertical slot opening at the top edge of the wall, a transverse connecting bar having one end pivoted to one of said walls, seating in said slots and capable of being shifted clear of the other of said walls, a combined draft and coupling bar extending into said casing and having an enlarged triangular-shaped head at its outer end for elevating the connecting bar to a position where it may fall by gravity behind the head onto the draft bar to couple said bars together, and a retaining bar having its rear end pivoted to the said other wall and seating on the free terminal portion of the connecting bar for maintaining it upon the draft bar.

2. A car coupler comprising a channel-shaped casing having each of its side walls intermediate its ends formed with a vertical slot opening at the top edge of the wall, a transverse connecting bar having one end pivoted to one of said walls, seating in said slots and capable of being shifted clear of the other of said walls, a combined draft and coupling bar extending into said casing and having an enlarged triangular-shaped head at its forward end for elevating the connecting bar to a position where it may fall by gravity behind the head onto the draft bar to couple said bars together, a retaining bar having its rear end pivoted to the said other wall and seating on the free end terminal portion of the connecting bar for maintaining it upon the draft bar, and means carried by that wall to which the retaining bar is pivoted for maintaining the latter against the connecting bar.

3. A car coupler comprising a channel-shaped casing having each of its side walls intermediate its ends formed with a vertical slot opening at the top edge of the wall, a transverse connecting bar having one end pivoted to one of said walls, seating in said slots and capable of being shifted clear of the other of said walls, a combined draft and coupling bar extending into said casing and having an enlarged triangular-shaped head at its forward end for elevating the connecting bar to a position where it may fall by gravity behind the head onto the draft bar to couple said bars together, a retaining bar having its rear end pivoted to the said other wall and seating on the free end terminal portion of the connecting bar for maintaining it upon the draft bar, and releasable spring controlled means carried by that wall to which the retaining bar is pivoted for maintaining the latter against the connecting bar.

4. A car coupler comprising a channel-shaped casing open at each end and having each of its side walls intermediate its ends formed with a slot opening at the top edge of the wall, a transverse connecting bar having one end pivoted to one of said walls, seating in said slot and capable of being shifted clear of the other of said walls, a combined draft and coupling bar extending into said casing and having an enlarged triangular-shaped head at its forward end for elevating the connecting bar to a position where it may fall by gravity behind the head onto the draft bar to couple said bars together, and a retaining bar having its rear end pivoted to the said other wall and seating on the free end terminal portion of the connecting bar for maintaining it upon the draft bar, that wall to which the retaining bar is pivoted having oppositely extending bevelled portions leading to the slot therein to facilitate the entrance of the connecting bar into such slot.

5. A car coupler comprising a channel-shaped casing open at each end and having each of its side walls intermediate its ends formed with a slot opening at the top edge of the wall, a transverse connecting bar having one end pivoted to one of said walls, seating in said slots and capable of being shifted clear of the other of said walls, a combined draft and coupling bar extended into said casing and having an enlarged triangular-shaped head at one end for elevating the connecting bar to a position where it may fall by gravity behind the head onto the draft bar to couple said bars together, and a retaining bar extending lengthwise of said casing and having its rear end pivoted to the said other side wall and seating on the free terminal portion of the connecting bar for maintaining it upon the draft bar, said retaining bar having its lower side provided with a shoulder for supporting said connecting bar in an elevated position when shifted clear of that wall to which the retaining bar is pivoted.

In testimony whereof, I affix my signature hereto.

LOCKHEART W. RAMAGE.